Oct. 25, 1949.  F. L. VAN WEENEN  2,486,081
MULTICYLINDER REFRIGERATING MACHINE
Filed Sept. 13, 1945
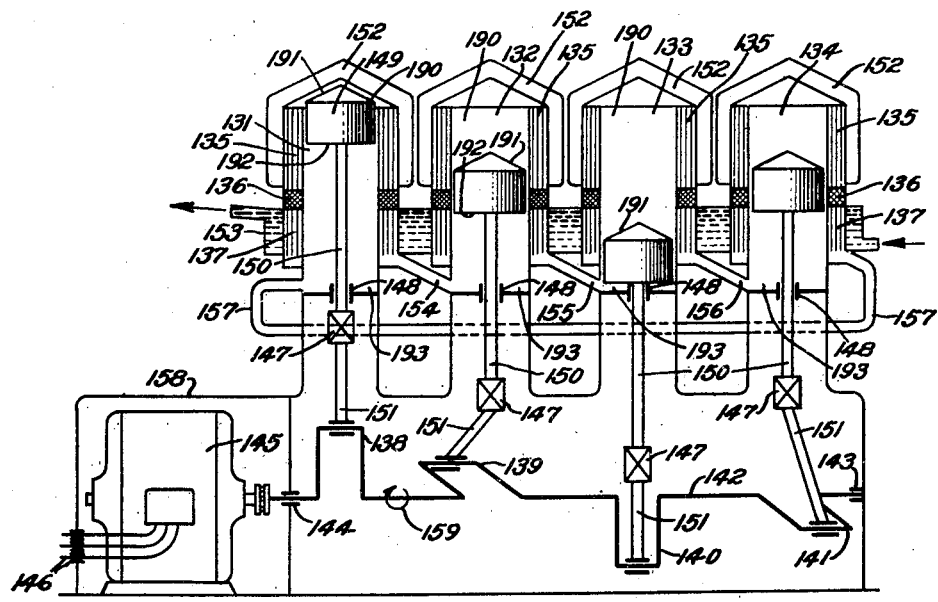
INVENTOR
FRANCISCUS LAMBERTUS VAN WEENEN
BY E. F. Wenderoth
ATTORNEY Patented Oct. 25, 1949

2,486,081

UNITED STATES PATENT OFFICE 2,486,081

MULTICYLINDER REFRIGERATING MACHINE

Franciscus Lambertus van Weenen, Eindhoven, Netherlands, assignor to Hartford National Bank & Trust Co., Hartford, Conn., as trustee Application September 13, 1945, Serial No. 616,093 In the Netherlands July 27, 1944

Section 1, Public Law 690, August 8, 1946 Patent expires July 27, 1964

2 Claims. (Cl. 62—136)

In addition to refrigerating engines of the type in which the heat is conducted away by means of a gas which passes from the gaseous state into the liquid state and vice versa there are also refrigerating engines in which the heat is conducted away by means of a gas which remains in the same physical state. In the latter type of machine the gas is successively expanded, thus storing heat, and compressed, thus evolving heat, this heat being then conducted away by a customary cooling-agent, such as water or air. This thermodynamic cycle is performed in an engine in which the gas is enclosed in a space of variable volume in which or in open communication with which there is a part intended for heat transmission from the medium to be cooled to the gas in the engine, a regenerator and in addition a part intended for the transmission of heat from the gas in the engine to the said cooling-agent, this last mentioned part also being in open communication with a second space of variable volume. The part of the engine intended for transmission of heat from the medium to be cooled to the gas in the engine will be referred to hereinafter as the "heater"; the part intended for heat transmission from the gas in the engine to the cooling-agent as the "cooler." The space of variable volume adjoining the heater will be referred to hereinafter as the "heated chamber" and the space adjoining the cooler as the "cooled chamber." Between the variations in volume of the heated and the cooled chambers there exists a phase difference such that the gas is compelled to perform the above-described cycle. Refrigerating engines of this kind are known for example from Zeuner's "Technische Thermodynamik," volume I. These refrigerating engines may be referred to as "closed cycle engines" since an invariable quantity of gas is compelled to follow the above-mentioned thermodynamic cycle. Even if a portion of the gas is allowed to flow away from the enclosures to a closed vessel or tube-system and thence can be returned into the compartments in which the cycle of operation takes place, the latter may be referred to as a closed cycle.

Refrigerating engines may also be constructed so as to comprise an open cycle, it then being possible for the cooler to be omitted. In this case the gas is conducted away from the cooled chamber to the open air and for the following cycle of operation a fresh supply of gas, in the particular case air, is drawn in.

The present invention relates solely to refrigerating engines of the kind described, in which the working medium circulates in the above described compartments in an unvaried physical state, i. e. according to the standard practice, in the gaseous state. A known form of such refrigerating apparatus is constructed to comprise a single thermodynamic cyclic process, so that to increase the engine output, the dimensions of the compartments in which this cycle of operation takes place, i. e., in this particular case, in the cylinders, as well as of the members that influence the volume of the heated and cooled chambers; all must be increased.

According to the present invention, a refrigerating engine of the above described type is constructed to comprise more than one cycle of operations which are performed in more than one cylinder. Each of these cylinders contains a double acting piston, one of whose faces acts upon the heated chamber and the other of which acts upon the cooled chamber. In order to obtain the necessary successive expansion and compression of the gas in each of the thermodynamic circuits, the heated chamber of each cylinder is connected to the cooled chamber of another cylinder, and the pistons of these cylinders are moved out of phase with each other.

By employing a single double acting piston in each of the cylinders, a single drive will suffice for each, in contradistinction to the known one-cylinder-engine in which there are always required two piston bodies moving with a relative phase-displacement. The two piston faces which together influence the volume of a single cyclic process and hence must move with a given phase-displacement relative to each other, are of necessity housed, in a multi-cylinder-engine, in two different cylinders. For each separate cycle of operation the heated chamber is thus enclosed in a cylinder different from that in which the cooled chamber is enclosed. This, however, introduces the advantage that the construction of the moving engine parts is considerably simpler than with the one-cylinder-engine, having a single cycle of operation each cylinder now requiring a single crank and connecting rod or else a single connection to a swash plate mechanism.

According to the invention, the two piston faces which in a single cylinder influence the volume of a heated chamber and of a cooled chamber are arranged on either side of a single piston body. In this manner, the space in the cylinder on either side of the piston is utilised so that it is necessary for the piston rod to be taken through the cylinder wall by means of a customary stuffing box packing.

In order that the invention may be clearly understood and readily carried into effect it will now be set out more fully with reference to the accompanying drawing, in which an embodiment of the invention is illustrated by way of example.

The single figure in the drawing is a diagrammatic view of a refrigerating machine which works on the principle mentioned before and in which four cycles of operations ensue in four cylinders.

The engine shown in the figure comprises a single crank-shaft 142 carrying four cranks 138, 139, 140 and 141. Each of these cranks has coupled to it a connecting rod 151, a piston rod 150 and a piston body 149. At the point of connection between the connecting rod 151 and the piston rod 150 there is provided a crosshead 147. Each of the four piston bodies moves in a cylinder 131, 132, 133 and 134 respectively. Each of the cylinders is surrounded by a heater 135, a regenerator 136 and a cooler 137, which are traversed by the gas enclosed in the cylinder. The heat is supplied from the medium to be cooled, for example the air in a refrigerating cell or in a refrigerator by means of a set of ribs 152 surrounding the heater 135 on the outside. The air to be cooled is in thermal contact with the ribs 152 of all of the four cylinders and transmits the heat to the said ribs. This heat is transmitted by the heater 135 to the gas in each of the cycles of operation. After absorption of the heat, the gas is compressed by the movement of the piston, with the result that the temperature rises. The hotter gas comes into contact with the cooler 137 and transmits the heat through this cooler to the cooling water enclosed in the jacket 153. This jacket with cooling water surrounds the coolers of all of the four cylinders together so that a single cooling-water supply and a single discharge pump are provided.

All the ribs 152 are provided on the heads of the four cylinders 131, 132, 133 and 134. This means therefore that the top of the engine, that is to say, that part which is remote from the crank-shaft side, becomes cold when the engine is in use and serves for cooling of the medium to be cooled. It is for example, possible to arrange these four cylinder-heads in the chamber to be cooled itself and to arrange that the remaining part of the engine protrudes from this chamber. The regenerators 136 are accommodated in the wall of the chamber to be cooled and thus form part of the thermal insulation of this chamber. It is also possible to arrange the whole of the engine in the chamber to be cooled and to blow the air to be cooled into this chamber by means of a fan so as to pass between the ribs 152. Although it is theoretically equally possible to arrange that each cylinder is so constructed that the portion which is cold when the engine is in use is arranged at the bottom of the cylinder, the construction as outlined is nevertheless to be preferred for the above-mentioned reasons.

As shown in the figure of the drawing, the cooler 137 of the cylinder 131 is connected by means of a pipe 154 to the space under the piston in the cylinder 132. Similarly the coolers of the cylinders 132, 133 and 134 are connected by means of the pipes 155, 156, 157 to the spaces below the pistons in the cylinders 133, 134 and 131, respectively. The space above each piston communicates directly with the heater 135 which surrounds the cylinder concerned. A heated chamber 190 together with the heater 135, the regenerator 136 and the cooler 137 of a cylinder, 131, and with a cooled chamber 193 in a further cylinder, say 132, forms an enclosure in which the gas is compelled to perform the thermodynamic cycle described. The volume of this enclosure is influenced by two different piston faces, to wit the upper surface 191 of a piston in one cylinder and the lower surface 192 of a piston in the other cylinder. These pistons are connected to two cranks which in the present case are at an angle to one another. The respective piston faces 191 and 192 consequently move with a given phase difference, the variation in volume of the space 193 being, in the direction of rotation of the engine indicated by the arrow 159, in advance with respect to that of the space 190.

The general operation of the refrigerating engine is as follows. The compartments 190 of each cylinder enclose a quantity of gas. After the piston has reached the top dead centre position, as is the case in the cylinder 131, and begins to descend, expansion occurs in the space above the surface 191 with the result that the gas contained therein cools. This permits of the said gas absorbing heat via the heater 135 and the ribs 152 from the medium to be cooled. Upon a subsequent increase in volume of the cooled chamber 193 this gas, which has absorbed heat, flows through a regenerator 136 and a cooler 137 to the cooled chamber 193. In this chamber compression then occurs, so that the temperature of the gas rises. At the same time the gas is returned through the cooler 137 to the heated chamber 190. In the cooler 137, however, the gas transmits the heat to the surrounding cooling liquid in the jacket 153 and thus returns at a lower temperature into the heated chamber 190. Again, expansion occurs in this chamber so that the gas cools and is again capable of absorbing heat, and so forth. This gas movement is performed in two different cylinders by two different piston faces moving with phase displacement. In any given cylinder a portion of two cycles of operation is performed. Now, the connection between the individual cylinders is such that the portions of the two cyclic processes that take place in one cylinder are performed with a relative phase displacement of 180°. The two piston faces which are required to influence these portions of two cycles of operation may therefore be coupled together at any time. In the embodiment shown these surfaces, 191 and 192 respectively, are arranged on either side of the piston body 149.

The four cylinders are arranged on a common crank case 158 sealed off from the surroundings in a gas-tight manner. The crank-shaft 142, with the four cranks placed therealong so that adjacent cranks are at angles of 90° with one another is supported within this crank-case by two bearings 143 and 144. This crank-case also contains an electric motor 145 which drives the refrigerating engine and the current supply leads 146 therefore are taken through the wall of the crank-case in a gas-tight manner. The cylinders are also sealed off from the crank-case in a gas-tight manner, the piston rods 150 being taken in a gas-tight manner through stuffing boxes 148 provided in the bottom surfaces of the cylinders.

For the arrangement of the various connecting channels from 154 to 157 inclusive between the cylinders and the coolers it is desirable that these cylinders be arranged as close together as is possible. The arrangement of four cylinders in line, as shown in the figure, has the advantage that a single crank-shaft suffices. Three of the four connecting channels, to wit 154, 155 and 156 may be short, but the connecting channel 157 between the first cylinder 131 and the cooler 137 of the fourth cylinder 134 is comparatively long. An improvement can be obtained by arranging the cylinders in pairs in the shape of V's forming an angle of 90°. In this case, a crank-shaft with two cranks suffices, each crank being engaged by two connecting-rods. The simplest form of construction is that in which the cylinders are arranged in a square and the pistons are driven through the intermediary of a swash plate mechanism. In the latter case, the four connecting channels may be very short. Moreover, in this case the construction of each cylinder is identical and this is advantageous particularly in connection with mass production methods.

The cycle of events of the confined gas in the operation of the refrigerating machine of the present invention will now be set forth in detail to include the relationship between the piston position, confined gas pressure and gas volume for every 90° of crank-shaft rotation starting from the position shown in the figure.

As the shaft 142 rotates 90° in the direction of the arrow 159, it will be seen that the piston in cylinder 131 will leave the top dead center position shown in the figure to move downwardly to a position midway of the ends of said cylinder; the piston in cylinder 132 will move to the top dead center position in said cylinder 132; the piston in cylinder 133 will move to a position midway of the ends of said cylinder 133; and the piston in cylinder 134 will move to the bottom dead center position in said cylinder 134. During the rotation of the shaft 142 as stated above and the concomitant movement of the pistons as likewise set forth above, the gas confined between face 191 of the piston in cylinder 131 and face 192 of the piston in cylinder 132 is expanded; the gas confined between the faces 191 and 192 of the pistons in cylinders 132 and 133, respectively, is displaced in a substantially constant volume from the "heated" chamber 190 of cylinder 132 to the "cooled" chamber 193 of cylinder 133; the gas confined between surfaces 191 and 192 of the pistons in cylinders 133 and 134, respectively, is compressed; and the gas confined between surfaces 191 and 192 of the pistons in cylinders 134 and 131, respectively, is displaced from the "cooled" chamber 193 of cylinder 131 to the "heated" chamber 190 of cylinder 134.

As the shaft 142 rotates through the next 90° in the direction of the arrow 159, the piston in cylinder 131 approaches bottom dead center position; the piston in cylinder 132 moves downwardly to a position substantially midway of the ends of said cylinder 132; the piston in cylinder 133 approaches top dead center position; and the piston in cylinder 134 moves upwardly to a position midway of the ends of said cylinder 134. As the pistons move as just described, the gas confined between surfaces 191 and 192 of the pistons in cylinders 131 and 132, respectively, is displaced in a substantially constant volume from the "cooled" chamber 193 in cylinder 132 to the "heated" chamber 190 in cylinder 131; the gas confined between surfaces 191 and 192 of the pistons in cylinders 132 and 133, respectively, is expanded; the gas confined between surfaces 191 and 192 of the pistons in cylinders 133 and 134, respectively, is displaced from the "heated" chamber 190 of cylinder 133 to the "cooled" chamber 193 of cylinder 134; and the gas confined between the surfaces 191 and 192 of the pistons in cylinders 134 and 131, respectively, is compressed.

In the next 90° of rotation of shaft 142 in the direction of the arrow 159, the piston in the cylinder 131 moves upwardly to a position midway of the ends of said cylinder, the piston in the cylinder 132 moves downwardly to the bottom dead center position; the piston in cylinder 133 moves downwardly to a position midway of the ends of said cylinder; and the piston in cylinder 134 moves upwardly to the top dead center position therein. As a result of the above movement of the piston, the gas confined between surfaces 191 and 192 of the pistons in cylinders 131 and 132, respectively, is compressed; the gas confined between surfaces 191 and 192 of the pistons in cylinders 132 and 133, respectively, is displaced in a substantially constant volume from the "cooled" chamber 193 of cylinder 133 to the "heated" chamber of cylinder 132; the gas confined between surfaces 191 and 192 of the pistons in cylinders 133 and 134, respectively, is expanded, and the gas confined between surfaces 191 and 192 of the pistons in cylinders 134 and 131, respectively, is displaced from the "heated" chamber 190 in cylinder 134 to the "cooled" chamber 193 in cylinder 131.

When shaft 142 rotates the next 90° to approach the position shown in the figure and so complete the cycle of operations, the gas confined between the surfaces 191 and 192 of the pistons in cylinders 131 and 132, respectively, is displaced in a substantially constant volume from the "heated" chamber 190 of cylinder 131 to the "cooled" chamber 193 in cylinder 132; the gas confined between the surfaces 191 and 192 of the pistons in cylinders 132 and 133, respectively, is compressed; the gas confined between the surfaces 191 and 192 of the pistons in cylinders 133 and 134, respectively, is displaced from the "cooled" chamber 193 of cylinder 134 to the "heated" chamber of cylinder 133; and the gas confined between the surfaces 191 and 192 of the pistons in cylinders 134 and 135, respectively, is expanded. After the position shown in the figure is reached, the cycle of operations described above is repeated.

What I claim is:

1. A multi-cylinder refrigeration machine comprising a plurality of cylinders cooled at one end and heated at the other end, within each of which is a piston connected to a common source of motive power and acting upon an incondensable gas, said cylinders being partially surrounded by a jacket through which the medium to be cooled passes, a conduit for passing the gas in a closed cycle of operation between the top of one cylinder and the bottom of another cylinder, said conduit containing means for exchanging heat with the gas and being partially surrounded by a jacket through which flows a cooling fluid for dissipating a portion of said heat.

2. A multi-cylinder refrigeration machine comprising a series of four cylinders in line, each cooled at one end and heated at the other end, within each of which is a double acting piston connected to a common source of motive power by means of a common crankshaft, each of said pistons moving 90° out of phase with the adjoining pistons and acting upon an incondensable gas, conduits for passing the gas in a closed cycle of operation between the top of each of the first three cylinders and the bottom of the cylinders next in line, another conduit for passing the gas in a closed cycle of operation between the top of the fourth cylinder and the bottom of the first cylinder in line, each of said conduits containing means for exchanging heat with the gas and being partially surrounded by a jacket through which flows a cooling fluid for dissipating a portion of said heat.

FRANCISCUS LAMBERTUS van WEENEN.

REFERENCES CITED

The following references are of record in the file of this patent:

UNITED STATES PATENTS

| Number | Name | Date |
|---|---|---|
| 252,921 | Allen | Jan. 31, 1882 |
| 1,240,862 | Lundgaard | Sept. 25, 1917 |